US008305671B2

(12) United States Patent
Lin

(10) Patent No.: US 8,305,671 B2
(45) Date of Patent: Nov. 6, 2012

(54) BIAXIAL SCANNING MIRROR FOR IMAGE FORMING APPARATUS AND METHOD FOR OPERATING THE SAME

(75) Inventor: Hung-Yi Lin, Taoyun (TW)

(73) Assignee: Touch Micro-System Technology Corp., Yangmei Township (TW)

( * ) Notice: Subject to any disclaimer, the term of this patent is extended or adjusted under 35 U.S.C. 154(b) by 249 days.

(21) Appl. No.: 12/819,264

(22) Filed: Jun. 21, 2010

(65) Prior Publication Data

US 2011/0310451 A1 Dec. 22, 2011

(51) Int. Cl.
*G02B 26/08* (2006.01)
(52) U.S. Cl. .................................................. 359/200.6
(58) Field of Classification Search .... 359/223.1–226.1, 359/290, 291, 871, 872
See application file for complete search history.

(56) References Cited

U.S. PATENT DOCUMENTS 6,989,921 B2 * 1/2006 Bernstein et al. .......... 359/224.1
7,355,317 B2 * 4/2008 Greywall .................... 359/225.1

* cited by examiner

*Primary Examiner* — Euncha Cherry
(74) *Attorney, Agent, or Firm* — Chen Yoshimura LLP

(57) ABSTRACT

A biaxial scanning mirror is disclosed in the present invention. The mirror includes: a first wafer having several cavities forming a first row and a second row, several permanent magnets each installed in one of the cavities, a spacer and a second wafer. The second wafer includes: a mirror unit, rotating around a first axis, for reflecting light beams; and a rotating unit, formed around the mirror unit, for rotating the mirror unit around a second axis which is perpendicular to the first axis. At least one coil substrate having a planar coil is assembled in the rotating unit.

19 Claims, 9 Drawing Sheets

BIAXIAL SCANNING MIRROR FOR IMAGE FORMING APPARATUS AND METHOD FOR OPERATING THE SAME

FIELD OF THE INVENTION

The present invention relates to a biaxial scanning mirror for an image forming apparatus and a method for operating the same. More particularly, the present invention relates to a biaxial scanning mirror magnetically rotating around two axes or magnetically rotating around one axis and electrically rotating around the other axis.

BACKGROUND OF THE INVENTION

Micro mirrors made by micro-electro-mechanical system (MEMS) process are wildly used for light beam scanning devices, such as a scanning mirror in a mini projector. Conventionally, it is driven by electrostatic forces at high rotating speed.

Please refer to FIG. 1A. U.S. Pat. No. 6,817,725 discloses a micro mirror unit 100 for incorporation in a device, such as an optical switch. The micro mirror unit 100 includes a mirror-formed portion 110 having an upper surface provided with a mirror surface (not illustrated), an inner frame 120 and an outer frame 120 (partly un-illustrated), each formed with comb-like electrodes integrally therewith. Specifically, the mirror-formed portion 110 has ends facing away from each other, and a pair of comb-like electrodes 110a and 110b are formed respectively on these ends. In the inner frame 120, a pair of comb-like electrodes 120a and 120b extend inwardly, corresponding to the comb-like electrodes 110a and 110b. Also, a pair of comb-like electrodes 120c and 120d extend outwardly. In the outer frame 120, a pair of comb-like electrodes 120a and 120b extend inwardly, corresponding to the comb-like electrodes 120c and 120d. The mirror-formed portion 110 and the inner frame 120 are connected with each other by a pair of torsion bars 140. The inner frame 120 and the outer frame 120 are connected with each other by a pair of torsion bars 150. The pair of torsion bars 140 provides a rotation axis for the mirror-formed portion 110 to rotate with respect to the inner frame 120. The pair of torsion bars 150 provides a rotation axis for the inner frame 120, as well as for the associating mirror-formed portion 110, to rotate with respect to the outer frame 120.

With the above arrangement, in the micro mirror unit 100, a pair of comb-like electrodes, such as the comb-like electrode 110a and the comb-like electrode 120a, are opposed closely to each other for generation of static electric force, and take positions as shown in FIG. 1B, i.e. one of the electrode assuming a lower position and the other assuming an upper position, when there is no voltage applied. When an electric voltage is applied, as shown in FIG. 1C, the comb-like electrode 110a is drawn toward the comb-like electrode 120a, thereby rotating the mirror-formed portion 110. More specifically, in FIG. 1A, when the comb-like electrode 110a is given a positive charge whereas the comb-like electrode 120a is given a negative charge, the mirror-formed portion 110 is rotated in a direction M1 while twisting the pair of torsion bars 140. On the other hand, when the comb-like electrode 120c is given a positive charge whereas the comb-like electrode 120a is given a negative charge, the inner frame 120 is rotated in a direction M2 while twisting the pair of torsion bars 150.

As a conventional method, the micro mirror unit 100 can be made from an SOI (Silicon on Insulator) wafer which sandwiches an insulating layer between silicon layers. However, according to the conventional method of manufacture as described above, the thickness of the wafer is directly dependent on the thickness of the micro mirror unit 100. Specifically, the thickness of the micro mirror unit 100 is identical with the thickness of the wafer which is used for the formation of the micro mirror unit. For this reason, according to the conventional method, the material wafer must have the same thickness as the thickness of the micro mirror unit 100 to be manufactured. This means that if the micro mirror unit 100 is to be thin, the wafer of the same thinness must be used. For example, take a case of manufacturing a micro mirror unit 100 having a mirror surface having a size of about 100 through 725 µm. In view of a mass of the entire moving part including the mirror-formed portion 110 and the inner frame 120, the amount of movement of the moving part, the size of the comb-like electrodes necessary for achieving the amount of movement, etc considered comprehensively, a desirable thickness of the moving part or the micro mirror unit 100 is determined. In this particular case, the desirable thickness is 100 through 200 µm. As a result, in order to manufacture the micro mirror unit 100 having such a thickness, a wafer having the thickness of 100 through 200 µm is used.

According to the conventional method, in order to manufacture a thin micro mirror unit 100, a correspondingly thin wafer must be used. This means that the greater diameter the wafer has, the more difficult to handle the wafer. For instance, take a case in which a micro mirror unit 100 is to be manufactured from an SOI wafer having a thickness of 200 µm and a diameter of 6 inches. Often, the wafer is broken in a midway of the manufacturing process. Further, the limitation on the size of the flat surface of the wafer places a limitation on the manufacture of micro mirror array chips. Specifically, when the micro mirror array chips are manufactured by forming a plurality of micro mirror units in an array pattern on a single substrate, the size of the array is limited.

Precise lateral alignment between two sets of comb-like electrodes, e.g., electrodes 120c and 120a, are inherently difficult to achieve since they are not coplanar and are fabricated in two different layers of the substrate. This can further result in non-linear and unstable behavior. Furthermore, driving force provided by the comb-like electrodes is limited and power needed by the electrodes to drive the mirror is large.

Please refer to FIG. 2A. In order to overcome the aforementioned disadvantages, magnets 210 are used to replace the comb-like electrodes for providing driving force to rotate a biaxial mirror assembly 200. Two side magnets 210a with the same magnetization direction are positioned on both sides of the biaxial mirror assembly 200 above a bottom magnet 210b with an opposite magnetization direction. However, these two side magnets 210a occupy a large space, and thus, such a structure is too big. Furthermore, it is hard to increase the magnetic field without drastically increasing the magnet volume.

To minimize the total size another structure having two magnets 230a placed on top of a biaxial mirror assembly 220, and another two magnets 230b placed below the biaxial mirror assembly 220 is shown in FIG. 2B. However, the total size of such structure is still too large due to the fact that the magnets 230a and 230b need to allow enough space for the biaxial mirror assembly 220 to rotate.

Therefore, a biaxial mirror assembly having a small size with large driving force is desperately desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a biaxial scanning mirror for an image forming apparatus, comprises: a first wafer having a plurality of cavities forming a first row and a second row; a plurality of permanent magnets each installed in one of the plurality of cavities, two adjacent permanent magnets of the same row having an air gap formed therebetween; a second wafer, comprises: a mirror unit, rotating around a first axis, for reflecting light beams; and a rotating unit, formed around the mirror unit, for rotating the mirror unit around a second axis which is perpendicular to the first axis; at least one coil substrate having a planar coil, assembled in the rotating unit; and a spacer, formed between the first wafer and the second wafer, for separating the first wafer and the second wafer.

Preferably, the mirror unit is driven by a comb drive actuator.

Preferably, the mirror unit is actuated by rotation of the rotating unit around the second axis.

Preferably, resonant frequency of the mirror unit around the first axis is higher than that of the rotating unit around the second axis.

Preferably, the coil substrate has a thickness smaller than 150 μm.

Preferably, the rotating unit has at least one slot for vertically receiving the coil substrate.

Preferably, the air gap has a width smaller than 250 μm.

Preferably, the air gap has a magnetic flux larger than 0.82 Tesla.

Preferably, the coil substrate is formed by micro-electromechanical systems (MEMS) process.

In accordance with another aspect of the present invention, a method of operating the biaxial scanning mirror, includes the steps of: a) generating a first magnetic field by the permanent magnets in the first row; b) generating a second magnetic field of which direction is opposite to that of the first magnetic field by the permanent magnets in the second row; c) providing a first signal to the planar coil for triggering the mirror unit to rotate around the first axis; and d) providing a second signal to the planar coil for triggering the rotating unit to rotate around the second axis.

Preferably, the first signal is sinusoidal with a frequency larger than 18 KHz and the second signal has a waveform of saw-tooth with a frequency of 60 Hz.

In accordance with yet another aspect of the present invention, a method of operating the biaxial scanning mirror, includes the steps of: a) generating a first magnetic field by the permanent magnets in the first row; b) generating a second magnetic field of which direction is opposite to that of the first magnetic field by the permanent magnets in the second row; c) providing a first signal to the mirror unit for triggering the mirror unit to rotate around the first axis; and d) providing a second signal to the planar coil for triggering the rotating unit to rotate around the second axis.

Preferably, the first signal is sinusoidal with a frequency larger than 18 KHz and the second signal has a waveform of saw-tooth with a frequency of 60 Hz.

DETAILED DESCRIPTION OF THE PREFERRED EMBODIMENT

The present invention will now be described more specifically with reference to the following embodiment. It is to be noted that the following descriptions of preferred embodiment of this invention are presented herein for purpose of illumination and description only; it is not intended to be exhaustive or to be limited to the precise form disclosed.

Figure 1A:
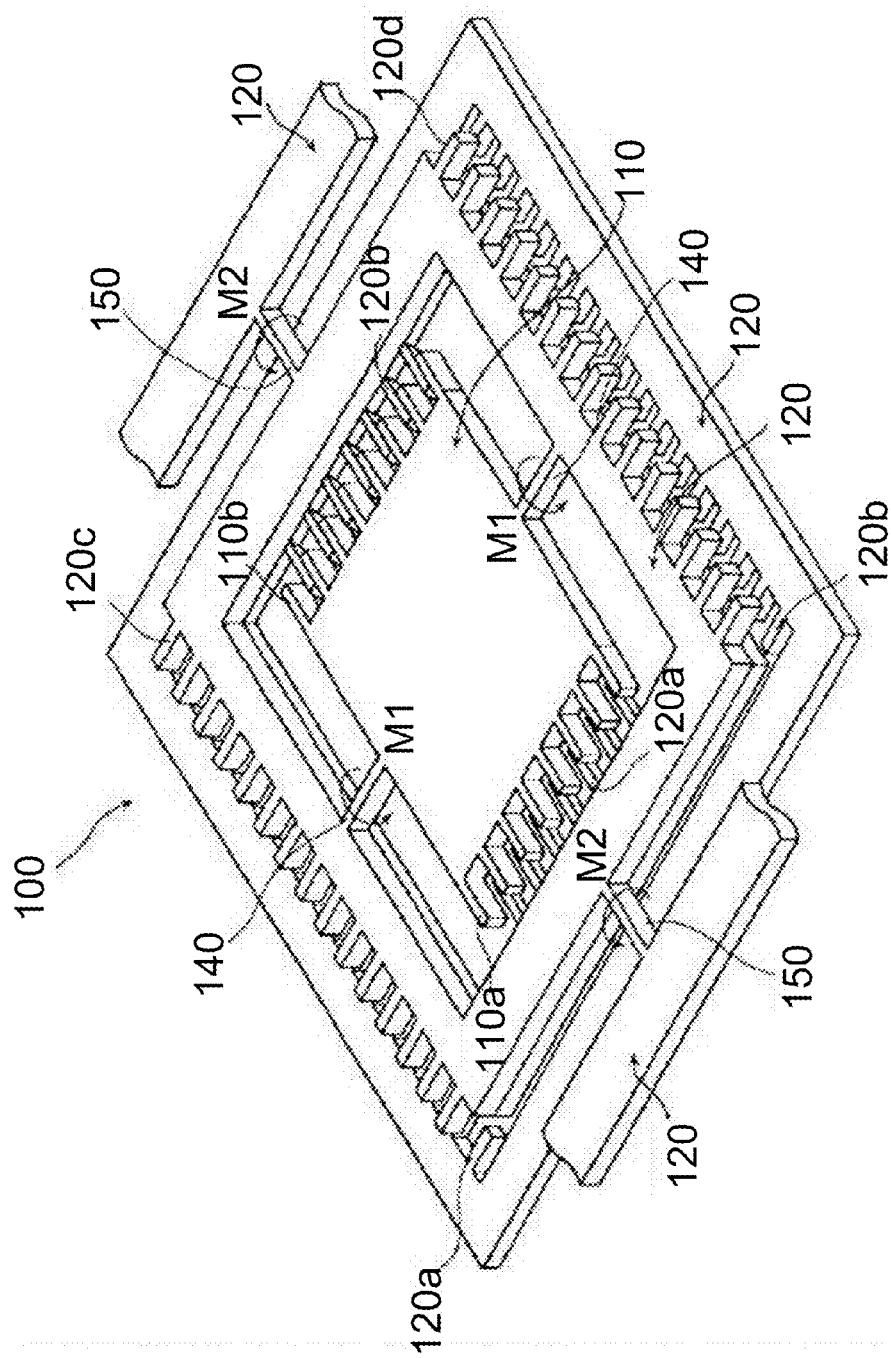
FIG. 1A shows a micro mirror of a prior art.
Figure 1B:
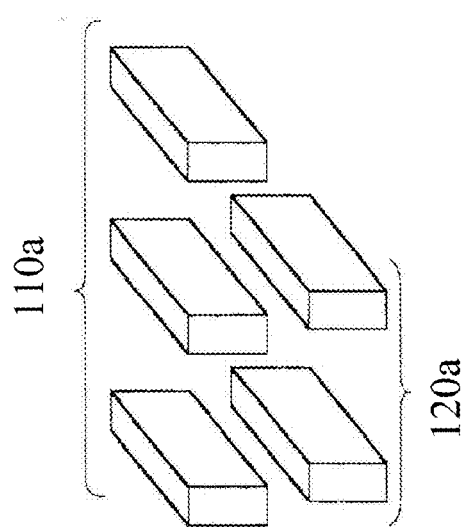
FIGS. 1B and 1C show mechanism of detailed structures of the prior art in FIG. 1A.
Figure 1C:
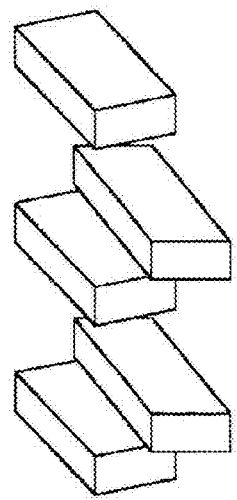
Figure 2A:
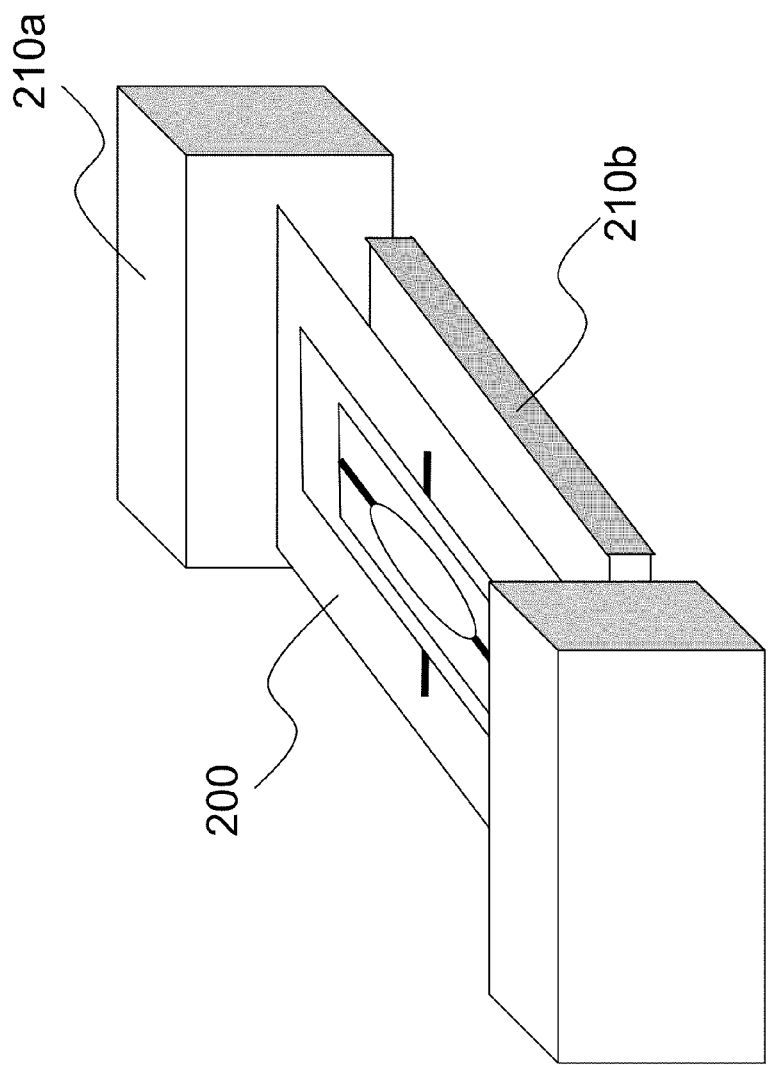
FIGS. 2A and 2B show biaxial scanning mirrors according to other prior arts.
Figure 2B:
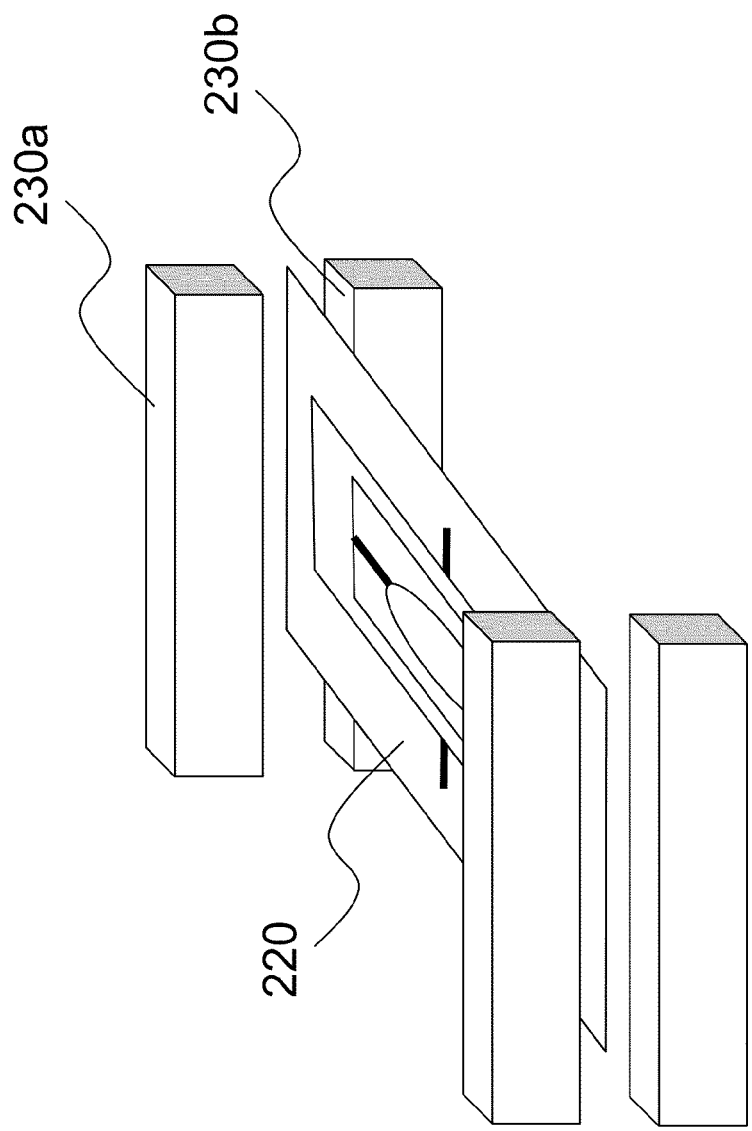
Figure 3:
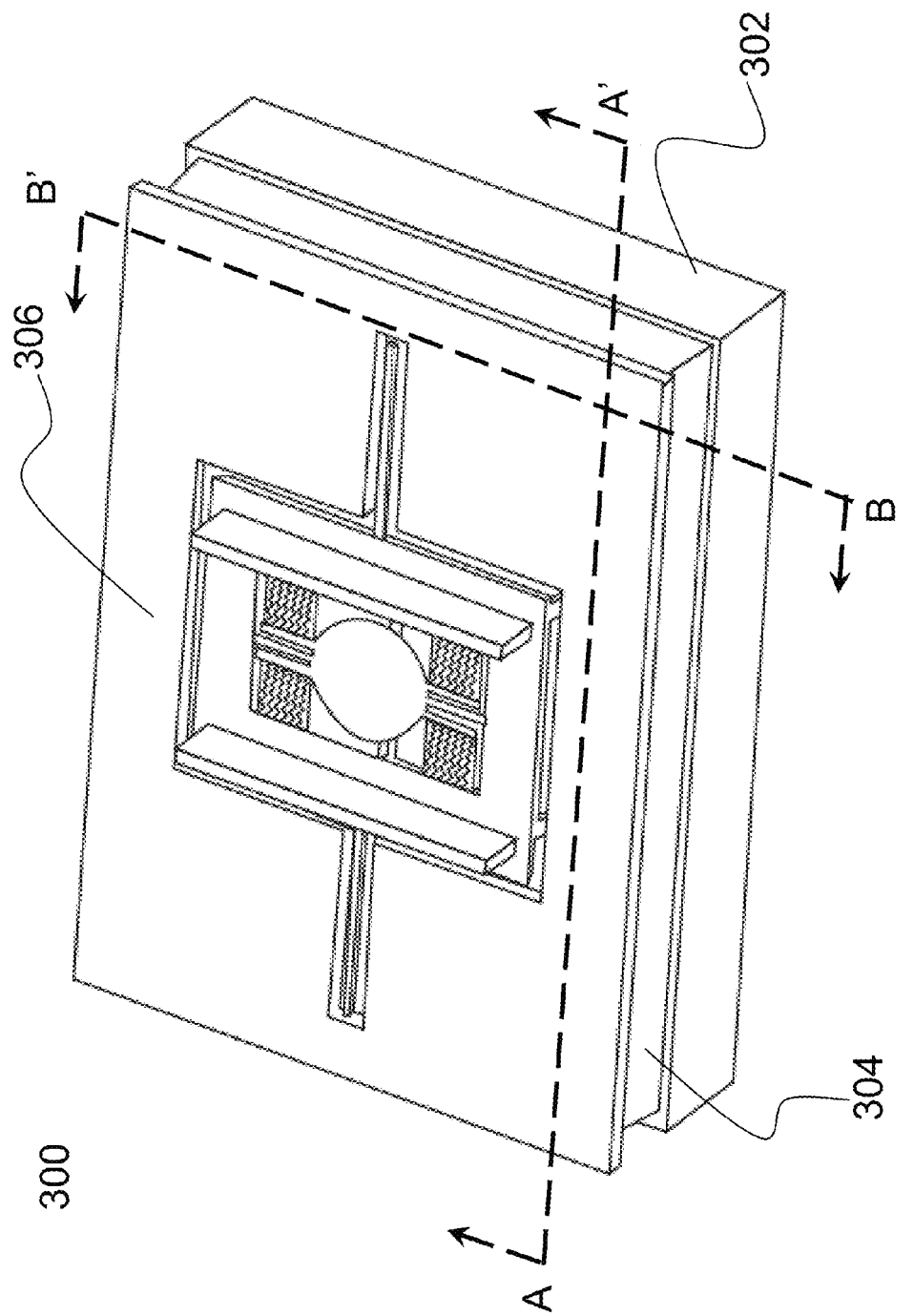
FIG. 3 shows a biaxial scanning mirror according to the present invention.
Figure 4:
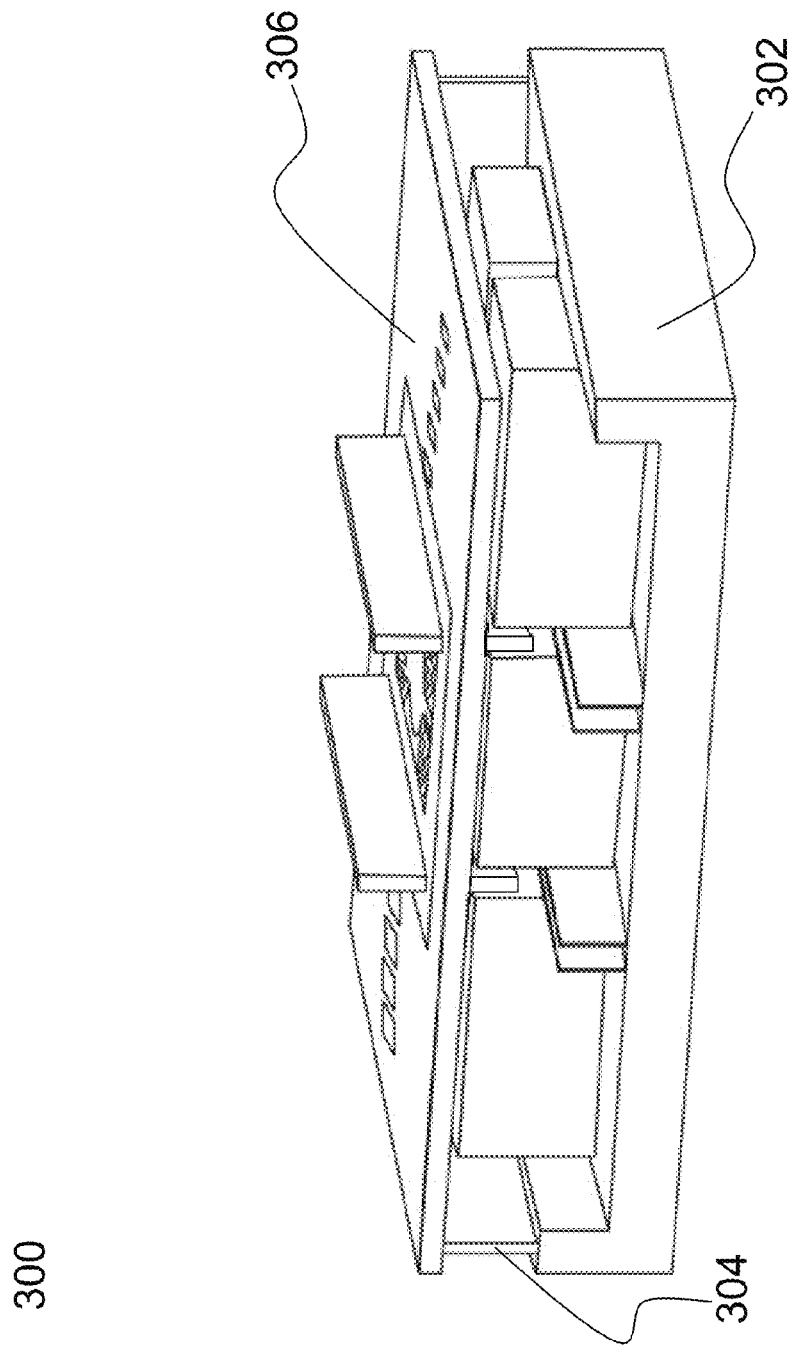
FIG. 4 illustrates a cross-sectional view of the biaxial scanning mirror of the present invention.

Please refer to FIG. 3. An embodiment is described. A biaxial scanning mirror 300 has a first wafer 302, a spacer 304 and a second wafer 306. The first wafer 302 and the second wafer 306 are both silicon wafers. In order to have detailed description for each component, a perspective view cut along lines AA' and BB" in FIG. 3 is shown in FIG. 4. It is obvious that the spacer 304 is fabricated between the first wafer 302 and the second wafer 306 for separating the first wafer 302 and the second wafer 306. Meanwhile, distance between the first wafer 302 and the second wafer 306 can be fixed as well.

Figure 5:
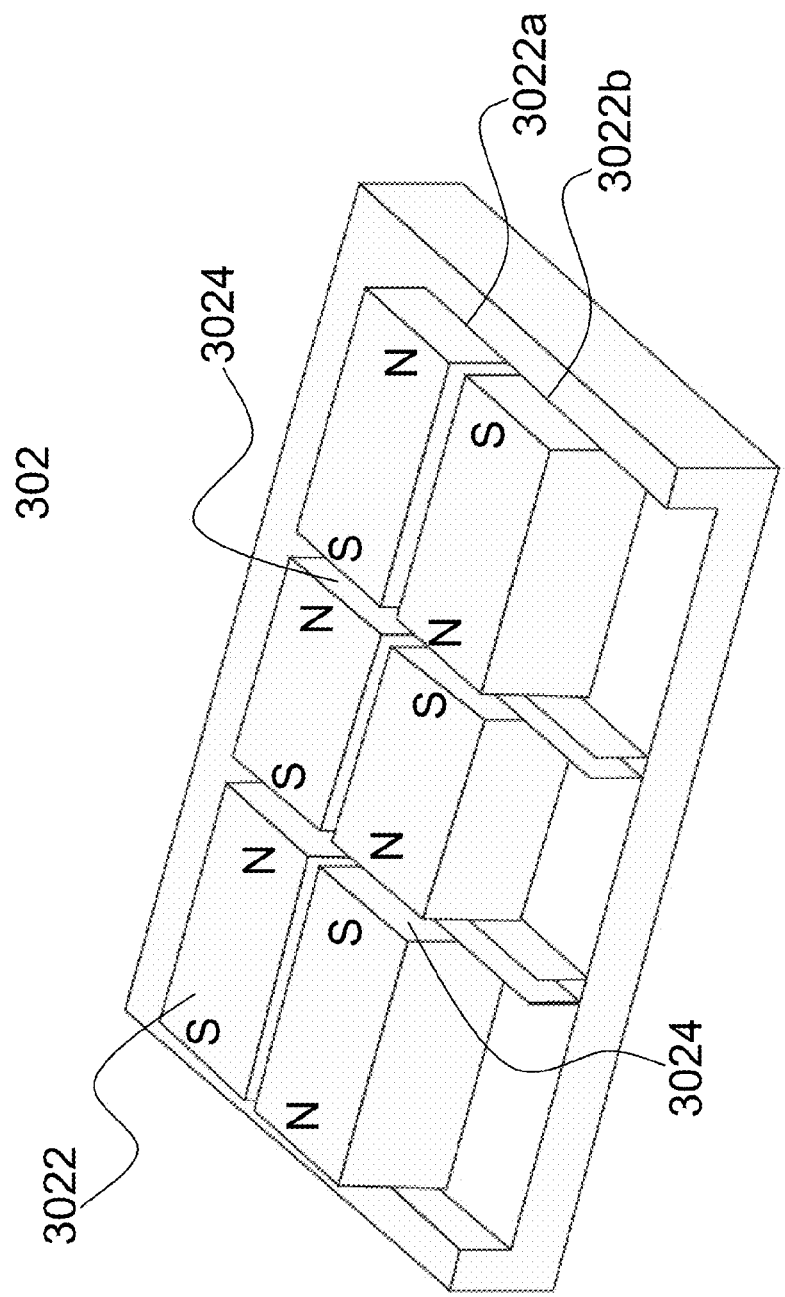
FIG. 5 illustrates a first wafer of the biaxial scanning mirror of the present invention.

Please refer to FIG. 5. The first wafer 302 has a number of cavities (not shown) which can be formed by deposition, photolithography, or etching There are permanent magnets 3022, having the same number as that of the cavities, installed in the cavities, respectively. The permanent magnets 3022 form a first row 3022a and a second row 3022b. An air gap 3024 is formed between two adjacent permanent magnets 3022 of the same row 3022a or 3022b. Due to the fact that the cavities are precisely positioned by micro-electro-mechanical systems (MEMS) technology, the air gap 3024 can be relatively narrow, thereby providing a large magnetic field by high density of magnetic lines in the air gap 3024. In the present invention, the air gap 3024 has a width smaller than 250 μm, allowing the permanent magnets 3022 to generate a magnetic flux of approximately 0.82 Tesla therebetween. Hence, a high Lorenz force can be produced by the large magnetic flux in the narrow air gap 3024.

As shown in FIG. 5, the permanent magnets 3022 in the first row 3022a provide a first magnetic field in a direction, and the permanent magnets 3022 in the second row 3022b provide a second magnetic field in an opposite direction.

Figure 6:
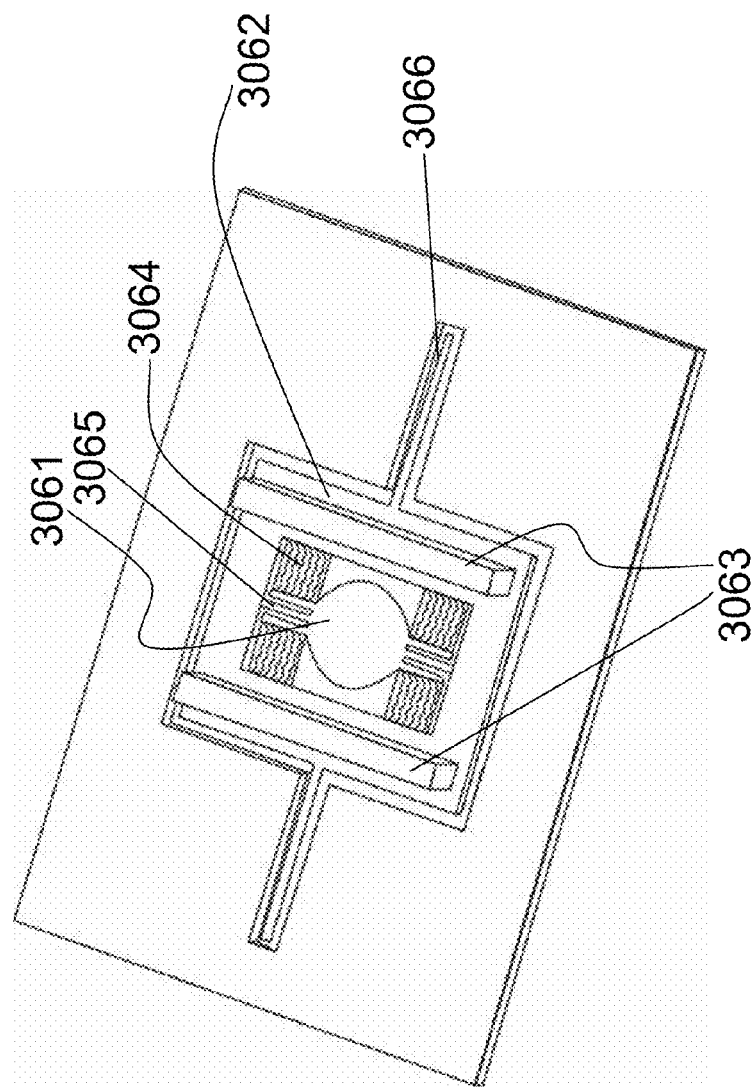
FIG. 6 illustrates a second wafer of the biaxial scanning mirror of the present invention.

Please refer to FIG. 6. The second wafer 306 comprises a mirror unit 3061 and a rotating unit 3062. The mirror unit 3061 rotates around a first shaft 3065 and can reflect light beams. The rotating unit 3062 is formed around the mirror unit 3061 for rotating the mirror unit 3061 around a second shaft 3066. The first shaft 3065 is perpendicular to the second shaft 3066. In the present invention, the mirror unit 3061 is driven by a comb drive actuator 3064. The comb drive actuator 3064 can also be replaced by other driving devices.

Alternatively, the mirror unit 3061 can also be actuated by rotation of the rotating unit 3062 around the second shaft 3066 due to the fact that the first shaft 3065 is connected to the rotating unit 3062. By this way, the mirror unit 3061 does not need the comb drive actuator 3064 for actuation.

Figure 7:
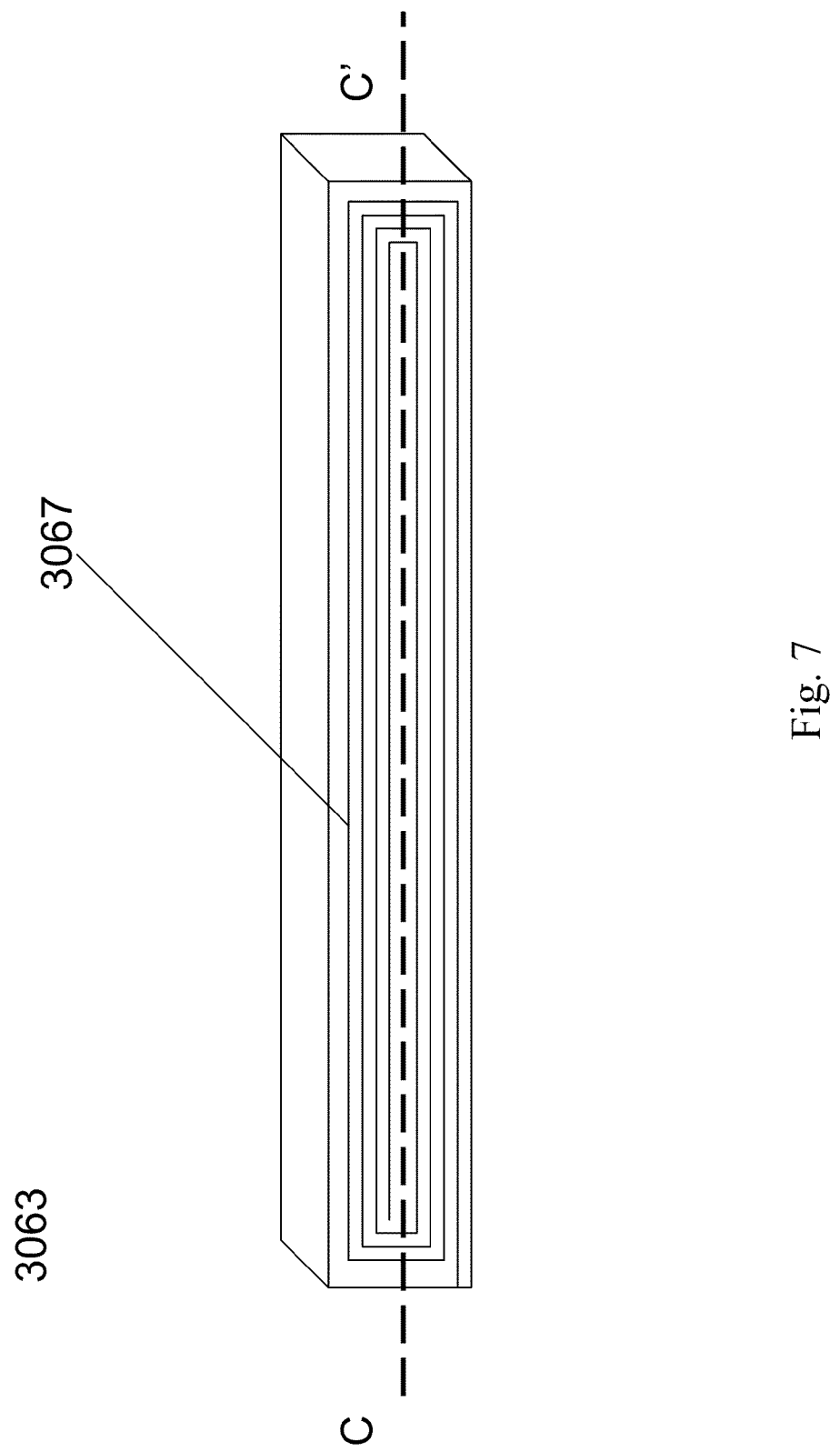
FIG. 7 shows a coil substrate of the second wafer of the biaxial scanning mirror of the present invention.

In this embodiment, the rotating unit 3062 has two slots (not shown) each for vertically assembling a coil substrate 3063. Each of the two coil substrates 3063 has a planar coil 3067. As shown in FIG. 7, the planar coil 3067 is formed on one side of the coil substrates 3063. Line CC' is across the middle part of the coil substrates 3063. The coil substrate 3063 has a thickness smaller than 150 μm. The planar coil 3067 is symmetrically arranged on two sides of the line CC'. As long as the planar coil 3067 is applied with an alternatively changed signal, current direction in the planar coil 3067 on two sides of the line CC' will change accordingly. When the first wafer 302, the spacer 304 and the second wafer 306 are configured, the lower part of planar coil 3067 is inserted into the air gap 3024 between two adjacent permanent magnets 3022 for interacting with the magnetic field formed by the permanent magnets 3022 to produce a Lorenz force which pushes the rotating unit 3062 to rotate around the second shaft 3066, thereby allowing the mirror unit 3061 to rotate around the second shaft 3066.

In the present embodiment, the coil substrates 3063 are positioned perpendicular to the second shaft 3066 rather than parallel, such that moment of inertia of the rotating unit 3062 does not increase too much by the Lorenz force. However, the coil substrates 3063 are not limited to such positions.

A saw-tooth signal with a frequency of 60 Hz is used as the alternatively changed signal applied to the planar coil 3067. In the present invention, a sinusoidal signal with a frequency larger than 18 KHz is provided to the mirror unit 3061 via the comb drive actuator 3064 for triggering the mirror unit 3061 to rotate around the first shaft 3065. Alternatively, a sinusoidal signal with a frequency larger than 18 KHz can also be provided to the mirror unit 3061 via the planar coil 3067 while a comb drive actuator is not used.

Usually, resonant frequency of the mirror unit 3061 around the first shaft 3065 is higher than that of the rotating unit 3062 around the second shaft 3066. In practice, the number of coil substrates 3063 is not limited to two. One coil substrate 3063 is enough for rotating the mirror unit 3061 around the second shaft 3066. Two are better to keep stability when rotating. The coil substrate 3063 is formed by micro-electro-mechanical systems (MEMS) process.

Hence, the biaxial scanning mirror 300 operates by generating a first magnetic field by the permanent magnets 3022 in the first row 3022a, generating a second magnetic field of which direction is opposite to that of the first magnetic field by the permanent magnets 3022 in the second row 3022b, providing the sinusoidal signal to the planar coil 3067 for triggering the mirror unit 3061 to rotate around the first shaft 3065, and providing a saw-tooth signal to the planar coil 3067 for triggering the rotating unit 3062 to rotate around the second shaft 3066.

Alternatively, the sinusoidal signal can be provided to the comb drive actuator 3064, for triggering the mirror unit 3061 to rotate around the first shaft 3065.

Due to the fact that the cavities are precisely positioned by micro-electro-mechanical systems (MEMS) technology, the first wafer 302, the second wafer 306, the permanent magnets 3022, and the coil substrates 3063 can be precisely assembled without dislocation.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A biaxial scanning mirror for an image forming apparatus, comprising:
    a first wafer having a plurality of cavities forming a first row and a second row;
    a plurality of permanent magnets each installed in one of the plurality of cavities, two adjacent permanent magnets of the same row having an air gap formed therebetween;
    a second wafer, comprising:
        a mirror unit, rotatable around a first axis, for reflecting light beams; and
        a rotating unit, formed around the mirror unit, for rotating the mirror unit around a second axis which is perpendicular to the first axis;
    at least one coil substrate having a planar coil, assembled in the rotating unit, wherein the planner coil is partially inserted into the air gap formed between the two adjacent permanent magnets; and
    a spacer, formed between the first wafer and the second wafer, for separating the first wafer and the second wafer.

2. The biaxial scanning mirror according to claim 1, wherein the mirror unit is driven by a comb drive actuator.

3. The biaxial scanning mirror according to claim 1, wherein the mirror unit is actuated by rotation of the rotating unit around the second axis.

4. The biaxial scanning mirror according to claim 1, wherein resonant frequency of the mirror unit around the first axis is higher than that of the rotating unit around the second axis.

5. The biaxial scanning mirror according to claim 1, wherein the coil substrate has a thickness smaller than 150 μm.

6. The biaxial scanning mirror according to claim 1, wherein the rotating unit has at least one slot for vertically receiving the coil substrate.

7. The biaxial scanning mirror according to claim 1, wherein the air gap has a width smaller than 250 μm.

8. The biaxial scanning mirror according to claim 1, wherein the air gap has a magnetic flux larger than 0.82 Tesla.

9. The biaxial scanning mirror according to claim 1, wherein the coil substrate is formed by micro-electro-mechanical systems (MEMS) process.

10. A method of operating a biaxial scanning mirror according to claim 1, comprising the steps of:
    a) generating a first magnetic field by the permanent magnets in the first row;
    b) generating a second magnetic field of which direction is opposite to that of the first magnetic field by the permanent magnets in the second row;
    c) providing a first signal to the planar coil for triggering the mirror unit to rotate around the first axis; and
    d) providing a second signal to the planar coil for triggering the rotating unit to rotate around the second axis.

11. The method according to claim 10, wherein the first signal is sinusoidal with a frequency larger than 18 KHz and the second signal has a waveform of saw-tooth with a frequency of 60 Hz.

12. A method of operating a biaxial scanning mirror according to claim 1, comprising the steps of:
    a) generating a first magnetic field by the permanent magnets in the first row;
    b) generating a second magnetic field of which direction is opposite to that of the first magnetic field by the permanent magnets in the second row;

c) providing a first signal to the mirror unit for triggering the mirror unit to rotate around the first axis; and d) providing a second signal to the planar coil for triggering the rotating unit to rotate around the second axis.

13. The method according to claim 12, wherein the first signal is sinusoidal with a frequency larger than 18 KHz and the second signal has a waveform of saw-tooth with a frequency of 60 Hz.

14. The method according to claim 12, wherein the first signal is provided to the mirror unit via a comb drive actuator.

15. The method according to claim 12, wherein the mirror unit is electrostatically triggered and the rotating unit is magnetically triggered.

16. A biaxial scanning mirror for an image forming apparatus, comprising:

a first wafer having a plurality of cavities forming one or more rows;

a plurality of permanent magnets each installed in one of the plurality of cavities, two adjacent permanent magnets of a same row having an air gap formed therebetween;

a second wafer, comprising:

a mirror unit, rotatable around a first axis, for reflecting light beams; and a rotating unit, formed around the mirror unit, for rotating the mirror unit around a second axis which is perpendicular to the first axis; and at least one coil substrate having a planar coil, connected to the rotating unit, wherein the planner coil is partially inserted into the air gap formed between the two adjacent permanent magnets.

17. A method for forming a biaxial scanning mirror for an image forming apparatus, comprising:

providing a first wafer having a plurality of cavities forming a first row and a second row;

installing a plurality of permanent magnets, each in one of the plurality of cavities, wherein two adjacent permanent magnets of the same row form an air gap therebetween;

providing a second wafer, comprising:

a mirror unit, rotatable around a first axis, for reflecting light beams; and a rotating unit, formed around the mirror unit, for rotating the mirror unit around a second axis which is perpendicular to the first axis;

assembling at least one coil substrate having a planar coil in the rotating unit; and placing the second wafer over the first wafer and partially inserting the planner coil into the air gap formed between the two adjacent permanent magnets.

18. A method of operating a biaxial scanning mirror formed by the method of claim 17, comprising:

a) generating a first magnetic field by the permanent magnets in the first row;

b) generating a second magnetic field of which direction is opposite to that of the first magnetic field by the permanent magnets in the second row;

c) providing a first signal to the planar coil for triggering the mirror unit to rotate around the first axis; and d) providing a second signal to the planar coil for triggering the rotating unit to rotate around the second axis.

19. A method of operating a biaxial scanning mirror formed by the method of claim 17, comprising:

a) generating a first magnetic field by the permanent magnets in the first row;

b) generating a second magnetic field of which direction is opposite to that of the first magnetic field by the permanent magnets in the second row;

c) providing a first signal to the mirror unit for triggering the mirror unit to rotate around the first axis; and d) providing a second signal to the planar coil for triggering the rotating unit to rotate around the second axis.

* * * * *